US007817592B2

(12) United States Patent
Yun et al.

(10) Patent No.: US 7,817,592 B2
(45) Date of Patent: Oct. 19, 2010

(54) METHOD OF OPERATING A TDD/VIRTUAL FDD HIERARCHICAL CELLULAR TELECOMMUNICATION SYSTEM

(75) Inventors: Sang-Boh Yun, Seongnam-si (KR); Sung-Hyun Cho, Seoul (KR); Yung-Soo Kim, Seongnam-si (KR); Eung-Sun Kim, Suwon-si (KR); Yeon-Woo Lee, Edinburgh (GB); Stephen McLaughlin, Edinburgh (GB)

(73) Assignees: Samsung Electronics Co., Ltd., Suwon-si (KR); The University Court of the University of Edinburgh, Edinburgh (GB)

(*) Notice: Subject to any disclaimer, the term of this patent is extended or adjusted under 35 U.S.C. 154(b) by 1483 days.

(21) Appl. No.: 11/030,397

(22) Filed: Jan. 6, 2005

(65) Prior Publication Data

US 2005/0174954 A1    Aug. 11, 2005

(30) Foreign Application Priority Data

Feb. 11, 2004    (GB)    ................... 0403007.8
Apr. 12, 2004    (KR)    ............ 10-2004-0025131

(51) Int. Cl.
*H04W 4/00*    (2009.01)

(52) U.S. Cl. ................ 370/328; 370/319; 370/320; 370/321; 370/322; 370/347; 370/330; 370/334; 370/335; 370/337; 370/338; 370/341; 455/443; 455/444; 455/449; 455/450; 455/451; 455/452.1; 455/452.2; 455/453; 455/455; 455/509; 455/515; 455/516; 455/517; 455/562.1

(58) Field of Classification Search ................ 455/450, 455/451, 452.2, 453, 447
See application file for complete search history.

(56) References Cited

U.S. PATENT DOCUMENTS 5,761,621 A * 6/1998 Sainton ....................... 455/453
5,805,633 A * 9/1998 Uddenfeldt ................. 375/133

(Continued)

FOREIGN PATENT DOCUMENTS

CN    1381108    11/2002

(Continued)

OTHER PUBLICATIONS

Haas et al., A Capacity Investigation on UTRA-TDD Utilising Underused UTRA-FDD Uplink Resources, IEE Colloquium on UMTS Terminals and Software Radio, Apr. 26, 1999.

(Continued)

*Primary Examiner*—Rafael Pérez-Gutiérrez
*Assistant Examiner*—Liton Miah
(74) *Attorney, Agent, or Firm*—NSIP Law

(57) ABSTRACT

A cellular communication system and method supporting both a time division duplexing (TDD) scheme and a frequency division duplexing (FDD) scheme. The apparatus includes a plurality of mobile stations, at least three first fixed stations communicate with the mobile station based on the FDD scheme, the first fixed station defining respective macro cells that are contiguous and form a virtual cell, and a cluster including at least one second fixed station communicating with the mobile stations based on the TDD scheme, the second fixed station defining a micro cell in the virtual cell.

20 Claims, 6 Drawing Sheets

U.S. PATENT DOCUMENTS

| | | | | |
|---|---|---|---|---|
| 6,094,421 | A * | 7/2000 | Scott | 370/280 |
| 6,859,655 | B2 * | 2/2005 | Struhsaker | 455/450 |
| 7,006,530 | B2 * | 2/2006 | Spinar et al. | 370/468 |
| 7,554,937 | B2 * | 6/2009 | Lim et al. | 370/316 |
| 2001/0055288 | A1 * | 12/2001 | Uebayashi et al. | 370/331 |
| 2002/0077152 | A1 | 6/2002 | Johnson et al. | |
| 2002/0080816 | A1 * | 6/2002 | Spinar et al. | 370/449 |
| 2002/0136170 | A1 * | 9/2002 | Struhsaker | 370/280 |
| 2002/0173277 | A1 * | 11/2002 | Takao et al. | 455/77 |
| 2003/0054829 | A1 * | 3/2003 | Moisio | 455/452 |
| 2004/0092232 | A1 * | 5/2004 | Zeira et al. | 455/67.11 |
| 2004/0203786 | A1 * | 10/2004 | Ishiguro et al. | 455/436 |

FOREIGN PATENT DOCUMENTS

WO     WO 00/07399     2/2000

OTHER PUBLICATIONS

Harald Hass et al., "The Effects of Interference Between the TDD and FDD Mode in UMTS at the Boundary of 1920 MHz", IEEE $6^{th}$ Symp. on Spread-Spectrum Tech. & Appli., Sep. 6-8, 2000.

* cited by examiner

⇒ Adjacent Channel Interference (ACI)
→ Interference if using FDD UL band
┈┈> Desired link
✕ Mitigated
▩ Underused FDD UL resource

METHOD OF OPERATING A TDD/VIRTUAL FDD HIERARCHICAL CELLULAR TELECOMMUNICATION SYSTEM

PRIORITY

This application claims priority to two applications entitled "METHOD OF OPERATING TDD/VIRTUAL FDD HIERARCHICAL CELLULAR TELECOMMUNICATION SYSTEM", filed in the Patent Office of Great Britain on Feb. 11, 2004 and assigned Serial No. GB 0403007.8, and in the Korean Intellectual Property Office on Apr. 12, 2004 and assigned Serial Nos. 2004-25131, the contents of both of which are incorporated herein by reference.

BACKGROUND OF THE INVENTION

1. Field of the Invention

The present invention relates generally to a method of operating a time division duplexing/virtual frequency division duplexing (TDD/virtual FDD) hierarchical cellular system in the context of a cell and sector deployment technique. In particular, though not exclusively, the present invention relates to a method of an unused resource borrowing mechanism and operation in such a network.

2. Background of the Related Art

Most operators have been allocated two or more (FDD) carriers in the recent Universal Mobile Telecommunications System (UMTS) frequency allocations. In principle, an allocation of one pair of FDD carriers enables the operation of only a single network layer. Two paired carriers can cater for a two-layer structure, such as a macro-cell layer together with a micro-cell or pico-cell layer. In hot-spot areas, highly loaded cells can be given extra capacity by adding another carrier to the cell, which would be more effective than increasing the base station transmission power, as described by Jaana Laiho, Achim Wacker, and Tomas Novosad, ed., *Radio Network Planning and Optimisation for UMTS*, John Wiley & Sons, Ltd., 2002.

One of the promising possible approaches is the TDD and FDD hierarchical cellular structure, which consists of a FDD macro-cell layer and a TDD micro-cell or pico-cell layer. In such a system, the TDD carrier is allocated for supporting hot-spot areas with highly asymmetric traffic with relatively low mobility. In general, the FDD cell and TDD cell use a different carrier in order to cope with inter-system interference. However, as illustrated in FIG. 1, there still exists the adjacent channel interference (ACI) as a system performance degradation factor, as described by Harald Haas, Steve McLaughlin, and Gordon Povey, "The Effect of Interference Between the TDD and FDD Mode in UMTS at the Boundary of 1920 MHz," in proceedings of IEEE 6th Intern. Symp. On Spread-Spectrum Tech. & Appli., NJIT, NJ, USA, pp. 486-490, Sep. 6-8, 2000. In their work, it has been shown that the effect of interference from the TDD carrier to FDD uplink is more significant and the trade-off for the optimal BS locations.

Another proposal is the exploitation of underused radio spectrum of a cellular CDMA-FDD system (since one communication direction of an FDD interface will be underused) which is named TDD/FDD underlay system proposed by Harald Haas and Gordon Povey, "Apparatus, Method of and System for Improving Capacity in Communication Network," International Patent Application Number: PCT/GB99/02223, 25 Jul. 1998 and by Harald Haas and Gordon Povey, "Capacity Analysis of A TDD Underlay Applicable to UMTS," in Proceeding of PIMR99, pp. 167-171. In this idea, a co-existing TDD interface with an unpaired frequency spectrum utilizes the underused FDD frequency band for additional connections, and the TDD is only considered to be operated in the FDD uplink band due to an anticipated channel asymmetry in favor of the downlink. The authors reported substantial capacity gains without a significant deterioration of the quality of service (QoS) and proposed strategies to cope with the additional interference caused by channel borrowing techniques; that is the TDD base station (BS) should ideally located to at a distance of about half the FDD cell radius.

Irrespective of the strategies adopted TDD/FDD underlay system still suffers adjacent channel interference (ACI) at the boundary of TDD and FDD uplink band and the additional interference caused by FDD uplink borrowing technique, since the TDD base station must simultaneously use both frequency bands in order to borrow underused FDD uplink resource. The interference scenario in such a system is illustrated in FIG. 1 where the TDD mobile station (MS) 18 and TDD BS 15 suffer severe interference from the FDD MS 14 with high transmission power at FDD uplink. Conversely, the TDD BS 15 also interferes with the reception of the FDD BS 11. As illustrated in FIG. 1, the ACI types at the boundary of TDD and FDD carrier band are quite similar to that of TDD/FDD underlay system borrowing underused FDD uplink spectrum. For our investigation in this invention, these two interference types such as ACI and the additional interference are taken into account.

SUMMARY OF THE INVENTION

Therefore, the present invention has been designed to at least partly mitigate the above-mentioned problems. It is an object of the present invention to reduce the additional interference in a TDD/FDD hierarchical underlay system, in particular in a sectored cellular system, because the sectorization method can achieve the capacity enhancement without additional carrier.

It is another aim of the present invention to maximize the overall system capacity in the context of efficient resource borrowing reflecting additional interference condition and underused resource.

According to a first aspect of the present invention there is provided a cellular communication system supporting at least two different duplexing schemes. The system includes: a plurality of mobile stations; at least one fixed station communicating with the mobile stations using a first duplexing scheme, the first fixed station defining a macro cell; and at least one second fixed station communicating with the mobile station using a second duplexing scheme, the second fixed station defining a micro or pico cell located inside a boundary of the macro cell.

According to a second aspect of the present invention there is provided a cellular communication system supporting at least two different duplexing schemes. The system includes: a plurality of mobile stations; at least three first fixed stations communicating with the mobile stations using a first-duplexing scheme, the first fixed stations defining respective macro cells that are contiguous and a virtual cell; and a micro or pico cell cluster including at least one second fixed station communicating with the mobile stations using a second-duplexing scheme, the second fixed station defining a micro or pico cell located in the virtual cell.

According to a third aspect of the present invention there is provided a cellular communication system supporting both a time division duplexing (TDD) scheme and a frequency division duplexing (FDD) scheme. The system includes: a plurality of mobile stations; at least three first fixed stations communicating with the mobile station based on the FDD scheme, the first fixed station defining respective macro cells that are contiguous and a virtual cell; and a cluster including at least one second fixed station communicating with the mobile stations based on the TDD scheme, the second fixed station defining a micro or pico cell in the virtual cell.

According to a fourth aspect of the present invention there is provided a method for constructing cellular communication system supporting communications between fixed stations and mobile stations based on both a frequency division duplexing (FDD) and a time division duplexing (TDD) schemes. The method includes: forming at least three contiguous macro cells defined by respective FDD-based fixed stations; forming at least one cluster including at least one micro or pico cell defined by a TDD-based fixed station; and forming a virtual cell surrounded by the FDD-based fixed stations.

According to a fifth aspect of the present invention there is provided a method for allocating radio resource in cellular communication system supporting communications between fixed stations and mobile stations based on both a frequency division duplexing (FDD) and a time division duplexing (TDD) scheme. The method includes: receiving, at a TDD fixed station, a call request from a TDD mobile station; determining whether or not TDD resource is available; allocating the TDD resource to the TDD mobile station when the TDD resource is available; borrowing resource from a FDD fixed station, when the TDD resource is not available; and allocating the FDD resource to the TDD mobile station according to a priority of the TDD mobile station.

As indicated above, the embodiments of the present invention provide a cell and sector planning method and a resource borrowing method for TDD/virtual FDD underlay cellular system. The benefits of the proposed TDD/virtual FDD hierarchical cellular system model are twofold: (1) to keep a reasonable distance between the TDD BS and the FDD BS in order to suppress interference in a schematic way; and (2) to fully utilize the surrounding three FDD BSs' resources as macro-diversity entities that may enable a flexible and easy resource borrowing mechanism.

Furthermore, the interference resolving technique of the present invention helps to align the TDD sector beam direction with the FDD one and use an adaptive beam forming method to avoid the additional interference caused by a FDD MS. From the radio resource borrowing mechanism perspective, the flexible share algorithm of underused FDD spectrum among carriers is another goal achieved by embodiments of this invention.

Preferably the present invention provides a cell and sector planning method and a resource borrowing method for TDD/virtual FDD underlay cellular system, and a flexible and easy resource borrowing mechanism. Furthermore, the interference resolving technique embodiments of this invention aligns the TDD sector beam direction with the FDD one and uses an adaptive beam forming method to avoid the additional interference caused by a FDD MS.

BRIEF DESCRIPTION OF THE DRAWINGS

The accompanying drawings, which are included to provide a further understanding of the invention and are incorporated in and constitute a part of this application, illustrate embodiment(s) of the invention by way of example only and together with the description serve to explain the principle of the invention. In the drawings.

DETAILED DESCRIPTION OF THE PREFERRED EMBODIMENT

Preferred embodiments of the present invention will be described in detail herein below with reference to the annexed drawings. In the following description, a detailed description of known functions and configurations incorporated herein will be omitted when it may obscure the subject matter of the present invention.

Figure 1:
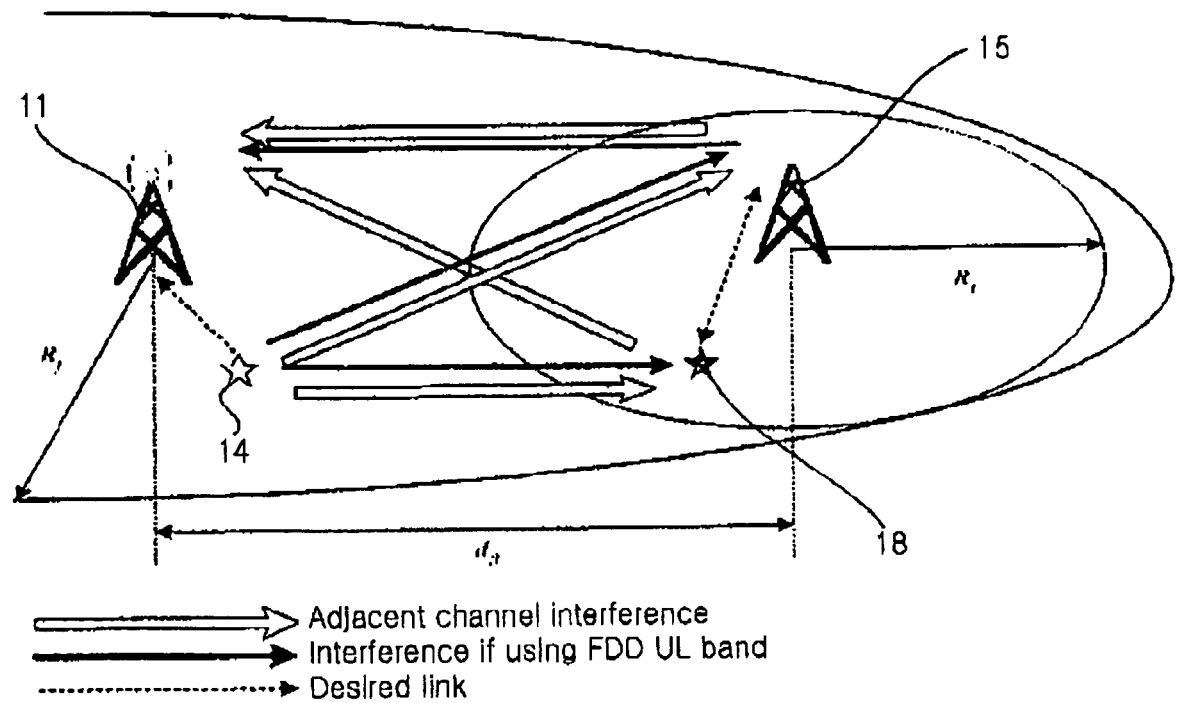
FIG. 1 is a schematic view illustrating inter-system interference in a conventional FDD/TDD hierarchical cellular system.
Figure 2:
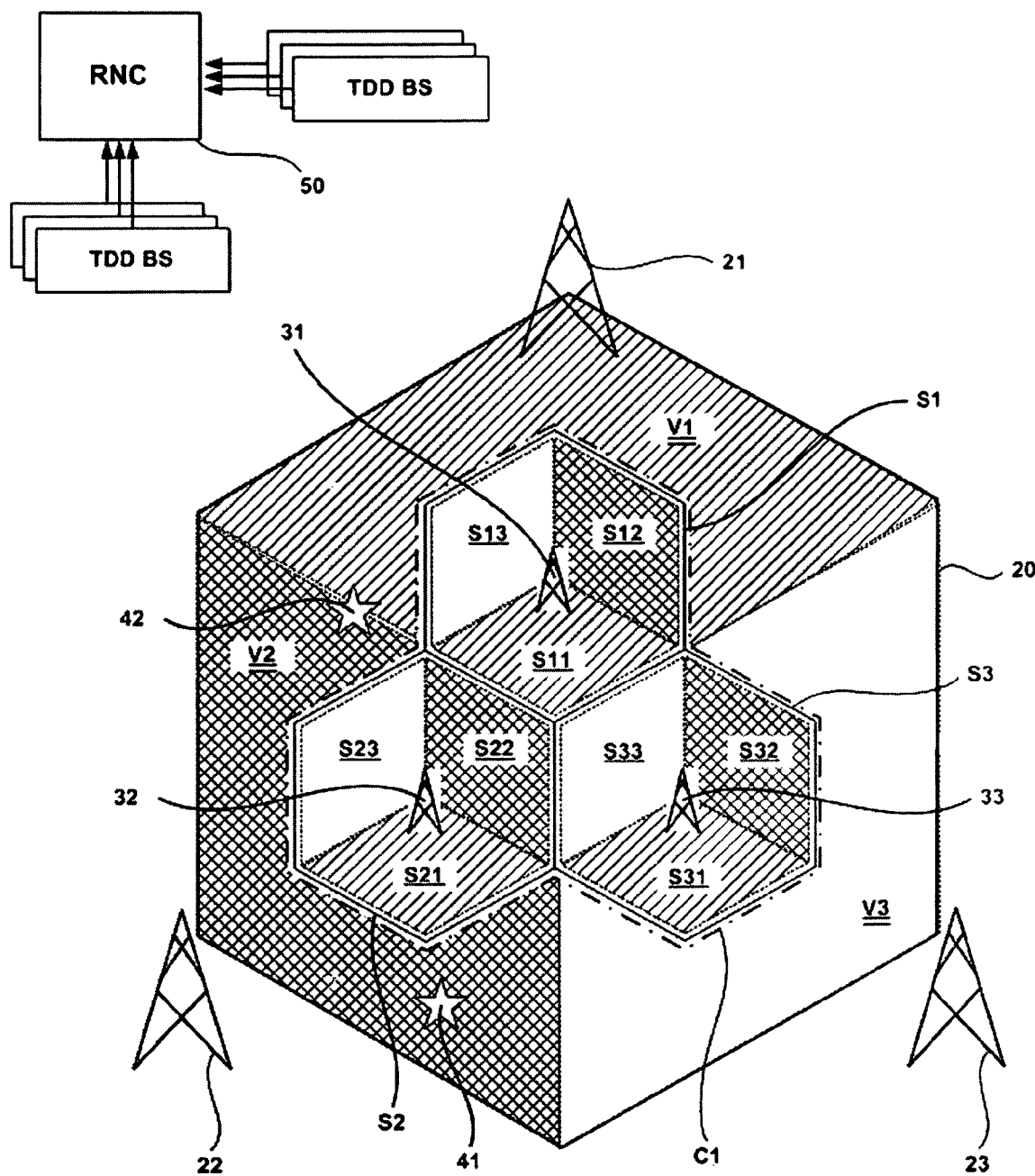
FIG. 2 is a conceptual view illustrating a TDD/virtual FDD hierarchical system according to a preferred embodiment of the present invention.
Figure 3A:
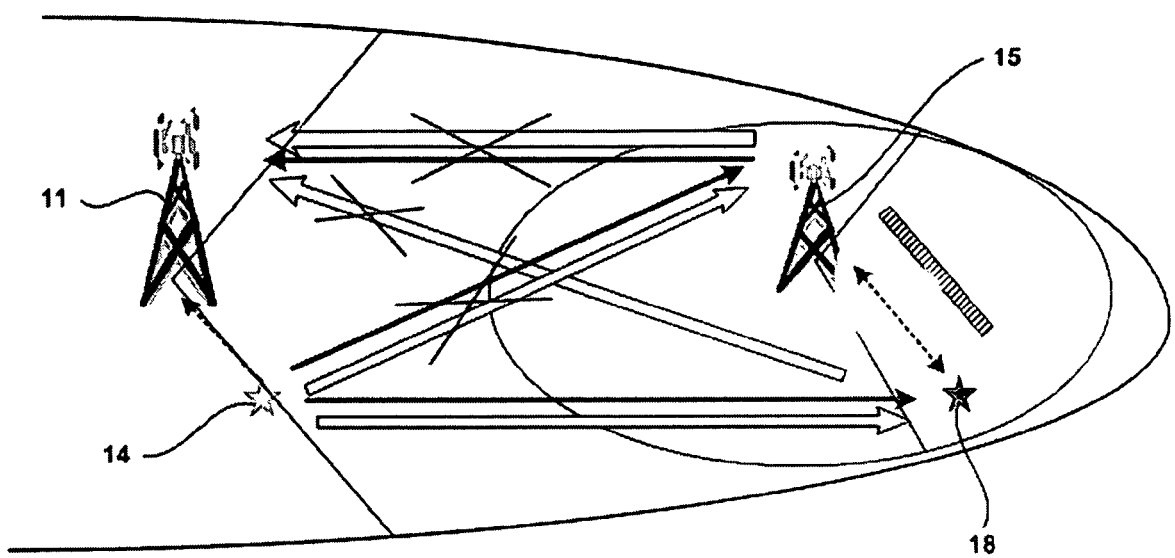
FIG. 3a is a schematic view illustrating mitigation of the inter-system interferences in the TDD/virtual FDD hierarchical system according to the preferred embodiment of the present invention.
Figure 3B:
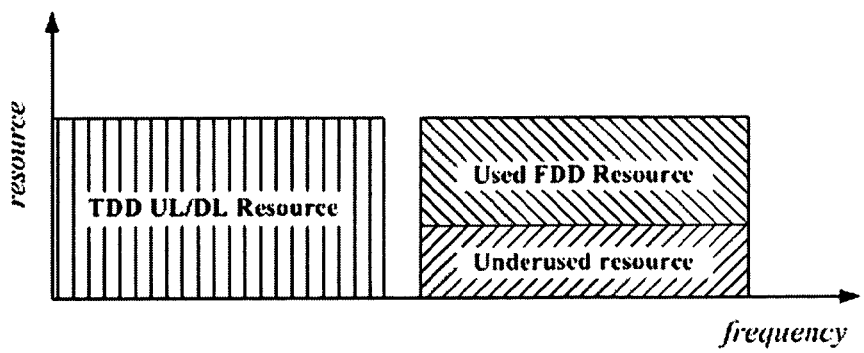
FIG. 3b is a diagram illustrating a method of borrowing an underused FDD resource for a TDD system.

The TDD/virtual FDD hierarchical cellular system model according to a preferred embodiment of the present invention achieves a twofold gain. Firstly, it maintains a reasonable distance between the TDD BS and the FDD BS to suppress the ACI and the additional interference, whether borrowing underused other spectrum or not. Secondly, it can fully utilize three surrounding FDD BSs' resources as macro-diversity entities such that a flexible and easy resource borrowing mechanism could be used. The TDD/virtual FDD hierarchical cellular system model according to a preferred embodiment of the present invention is depicted in FIG. 2, and the mitigated interference scenario is illustrated in FIG. 3a and FIG. 3b. In the preferred embodiment of the present invention each cell is sectorized into 3 sectors for explanation convenience.

As illustrated in FIG. 2, TDD cells cover pico- or micro-cell layer and FDD cells cover macro-cell layer. Three adjacent FDD BSs 21, 22, and 23 define respective macro cells and also define a virtual cell 20 that are consisted of adjacent macro sectors V1, V2, and V3 belonged to the respective macro cells. Also, the adjacent TDD BSs 31, 32, and 33 define respective micro cells S1, S2, and S3 so as to form a micro cell cluster C1.

The micro cell S1 is sectorized to form three micro sectors S11, S12, and S13, the micro cell S2 is sectorized into three micro sectors S21, S22, and S23, and the micro cell S3 is of micro sectors S31, S32, and S33. The micro cell cluster C1 is located at the center of the virtual cell 20, i.e., at the boundary of the macro cells.

In this structure, TDD carrier is allocated for covering hot-spot areas supporting highly asymmetric traffic with relatively low mobility. Following the investigation of TDD/FDD underlay, as described by Harald Haas and Gordon Povey, "Capacity Analysis of A TDD Underlay Applicable to UMTS," in Proceeding of PIMR99, pp. 167-171, the TDD BS should ideally located to at a distance of about half the FDD cell radius. Accordingly, it is reasonable that three TDD cells cluster are located at FDD macro-cell boundary as illustrated in FIG. 2, because FDD macro-cell BS covers the center zone, near to the BS, by transmitting higher BS power level. Note that this location is dependent on the TDD and FDD cell sizes. In general, the sectorization technique is used to obtain the frequency reuse efficiency in cellular communication systems, thereby increasing in capacity the cell by dividing one cell into several sectors. Therefore, with this principle, the sectored TDD and FDD hierarchical cellular system can guarantee capacity enhancement.

FIG. 2 illustrates a three TDD cell cluster example. However, it should be noted that more than three TDD cells can gather with much smaller radius. Thus, not every TDD BSs can keep a reasonable distance from the FDD BS, unless TDD cells cluster are located as like in FIG. 2.

The present invention provides a method for aligning the sectored TDD cells' beams and the adaptive beam forming mechanism to avoid ACI, if TDD band and FDD uplink band are contiguous, and to avoid the additional interference caused by FDD MS when applying the underused resource borrowing technique.

Herein it is assumed that each FDD sector has its own sector-specific scrambling code to differentiate it from other sectors or other cells' sectors from its own sector, and each TDD sector also use its own sector-specific code.

TDD and Virtual FDD Sectors' Beam Direction and Cell Alignment

1) The main lobe direction of a FDD sector beam should be aligned parallel with a TDD sector beam in order to mitigate the interference from $MS_{FDD}$ to TDD BS, e.g., second FDD BS's sector beam (V2) and second TDD BS's sector beam ($S_{22}$) in FIG. 2, and to avoid the interference from the TDD BS to the FDD BS due to the directivity of sector antenna's beam pattern. The sector antenna of second TDD BS ($S_{22}$) cannot radiate backward and receive the signal behind the back lobe of its beam. Thus, the interference caused by $MS_{FDD}$ 41 located behind the back lobe of TDD sector $S_{22}$ is no longer influenced. This rule can be applied to other TDD sectors $S_{12}$ and $S_{32}$.

2) Since the two TDD sectors $S_{21}$ and $S_{23}$ are likely to experience the interference from $MS_{FDD}$ 41 and cause interference to second FDD BS 22, the procedure 1) should be applied to only TDD sectors having the same direction of its sector main beam lobe. That is to say, the sectors $S_{12}$, $S_{22}$, and $S_{32}$ should be aligned with second FDD BS2 22 in parallel. With similar reasoning, sectors $S_{11}$, $S_{21}$, and $S_{31}$ are aligned with the first FDD BS 21, and $S_{13}$, $S_{23}$, and $S_{33}$ with third FDD BS 23. In N multiple TDD cells within a virtual cell, each TDD sector $S_{jx}$ (j=1, 2, . . . , N, x∈{1,2,3}) should be aligned with an FDD BS x. If the TDD cell is divided into M TDD sectors, each sector $S_{1k}$ (k=1, 2, . . . , M) should be aligned with the corresponding FDD BS x depending on the set of sectors having the same beam direction with FDD BS x. All TDD sectors are divided into three sets of sectors of which total azimuth angle must be within 120 degree.

For Contiguous TDD Band and FDD Uplink Band

3) If the underused resource borrowing technique is not applied, this mechanism of procedure 1) and 2) can also be used for suppressing the ACI caused at the boundary of UTRA TDD band and FDD uplink band. Even if the TDD BS does not use the same frequency as the FDD uplink band, adjacent channel interference is incurred at the boundary of 1920 MHz in the UMTS system, as described by Harald Haas, Steve McLaughlin, and Gordon Povey, "The Effect of Interference Between the TDD and FDD Mode in UMTS at the Boundary of 1920 MHz," in proceedings of IEEE 6th Intern. Symp. On Spread-Spectrum Tech. & Appli., NJIT, NJ, USA, pp. 486-490, Sep. 6-8, 2000.

With this mechanism and structure, the ACI from the TDD BS to the FDD BS and from the TDD MS to the FDD BS is completely eliminated only if these two BSs' sector beam lobes have the same direction. Even though the other sectors cannot resolve these interferences completely, this mechanism can guarantee a considerable interference resolving effect. Moreover, a considerable amount of the interference from FDD MSs to TDD BS can be suppressed in a schematic way. This scenario is illustrated in FIG. 3a and FIG. 3b.

As illustrated in FIG. 3a, the ACIs from TDD BS 15 and TDD MS 18 to the FDD BS and from FDD MS 14 to TDD BS are mitigated. Also, the additional interferences from the TDD BS 15 to FDD BS 11 and from FDD MS 14 to TDD BS 15 are mitigated. The additional interferences are caused by borrowing FDD UL resource, as illustrated in FIG. 3b, where the underused FDD UL resource is borrowed for the TDD cell. The thick empty arrows, in FIG. 3a, indicates the ACI and crossed marks mitigated interference link due to this cell and sector alignment method in a TDD/virtual FDD hierarchical system.

For Sharing and Borrowing Underused FDD Uplink

4) When the underused resource borrowing technique is applied, this should be carefully coordinated along with a sector and cell alignment planning technique. Following procedure of the TDD and virtual FDD sectors' beam alignment method as set forth in procedure 1) and 2), the key proposed sharing and borrowing method is that $MS_{TDD}$ in sector $S_{1x}$ (x∈{1,2,3}) can borrow an underused FDD BS x's uplink resource if available. For example, $MS_{TDD}$ located in sector $S_{12}$, $S_{22}$, and $S_{32}$ can share and borrow the underused resource (i.e. code slots if the FDD system is using CDMA, time slot for TDMA, or composite time/code/frequency slot for TDD-OFDM-CDMA) of second FDD BS 22. With the similar reasoning, $MS_{TDD}$ in sector $S_{11}$, $S_{21}$, and $S_{31}$ can borrow the underused resource in the first FDD BS 21. If N multiple TDD cells within a virtual cell, $MS_{TDD}$ users in each TDD sector $S_{jx}$ (j=1, 2, . . . , N, x∈{1,2,3}) can be allowed to borrow the underused resource in FDD BS x. For M TDD sectors in a TDD cell, $S_{1k}$ (k=1, 2, . . . , M), $MS_{TDD}$ users can borrow and share the underused resource of FDD BS x, which are decided by segmenting multiple sector into corresponding sectors such as $S_{1x}$ (x=mod(k(M/3))+1) within 120 degree total azimuth angle; e.g. for 6 sector with the same beam angle, $S_{1k}$ (k∈{1,2}) is related to the first FDD BS 21. Therefore, the TDD/virtual FDD hierarchical cellular structure by its schematic feature can obtain a strong advantage in terms of fully exploiting sectorization gain and suppressing additional interference caused by resource borrowing mechanism.

5) Another idea of the current invention is to use smart antenna (or adaptive beam forming) technique rather than use sectored antenna in such a way that smart antenna beam or adaptively formed beam focused on $MS_{TDD}$ can further reduce the interference from $MS_{FDD}$ to TDD BS, thanks to the selectivity of antenna beam. However, TDD users in a same sector can suffer the additional adjacent channel interference at the boundary of TDD band and FDD uplink band, which are incurred from some other users borrowing adjacent frequency spectrum in that some TDD users are using their own original TDD frequency band while other additional resource borrowers are using contiguous FDD uplink band. As a result, it is necessary to apply either a smart antenna or an adaptive beam forming. However, if all the TDD users including resource borrowers in the same sector use the same time slot partitioning (i.e., the same time slot frame structure), the additional adjacent channel interference is no longer matter of concern. Accordingly, this method can enhance the interference suppressing feature of the proposed TDD/virtual FDD system.

The Idea of Underused Resource Borrowing Algorithm With Smart Antenna in a TDD/Virtual FDD Hierarchical System Note that as illustrated in FIG. 2, three TDD BSs 31, 32, and 33 and corresponding three adjacent FDD BSs' sectors V1, V2, and V3 making up a virtual cell, are located such that it is easier to control the radio resource as well as the underused resource from the three FDD BSs 21, 22, and 23, which are connected to the same radio network controller (RNC) 50. Therefore, if the underused spectrum is not limited to the adjacent carrier such as the FDD uplink band but extended to multi-carriers or extra carriers, this smart antenna or adaptive beam forming technique incorporated with the TDD/virtual FDD hierarchical cellular system structure can deliver a further degree of freedom to control the radio resource, such that in a hot-spot area (i.e., TDD area), narrow and directional beams can guarantee reliable links to TDD HSDPA users and release available resources from conventional bands or additional bands. This can be easily performed because the three TDD BSs 31, 32, and 33 and corresponding three adjacent FDD BSs' sectors V1, V2, and V3 in the virtual cell 20 can lead the RNC 50 to have a more flexible resource management control.

Figure 4:
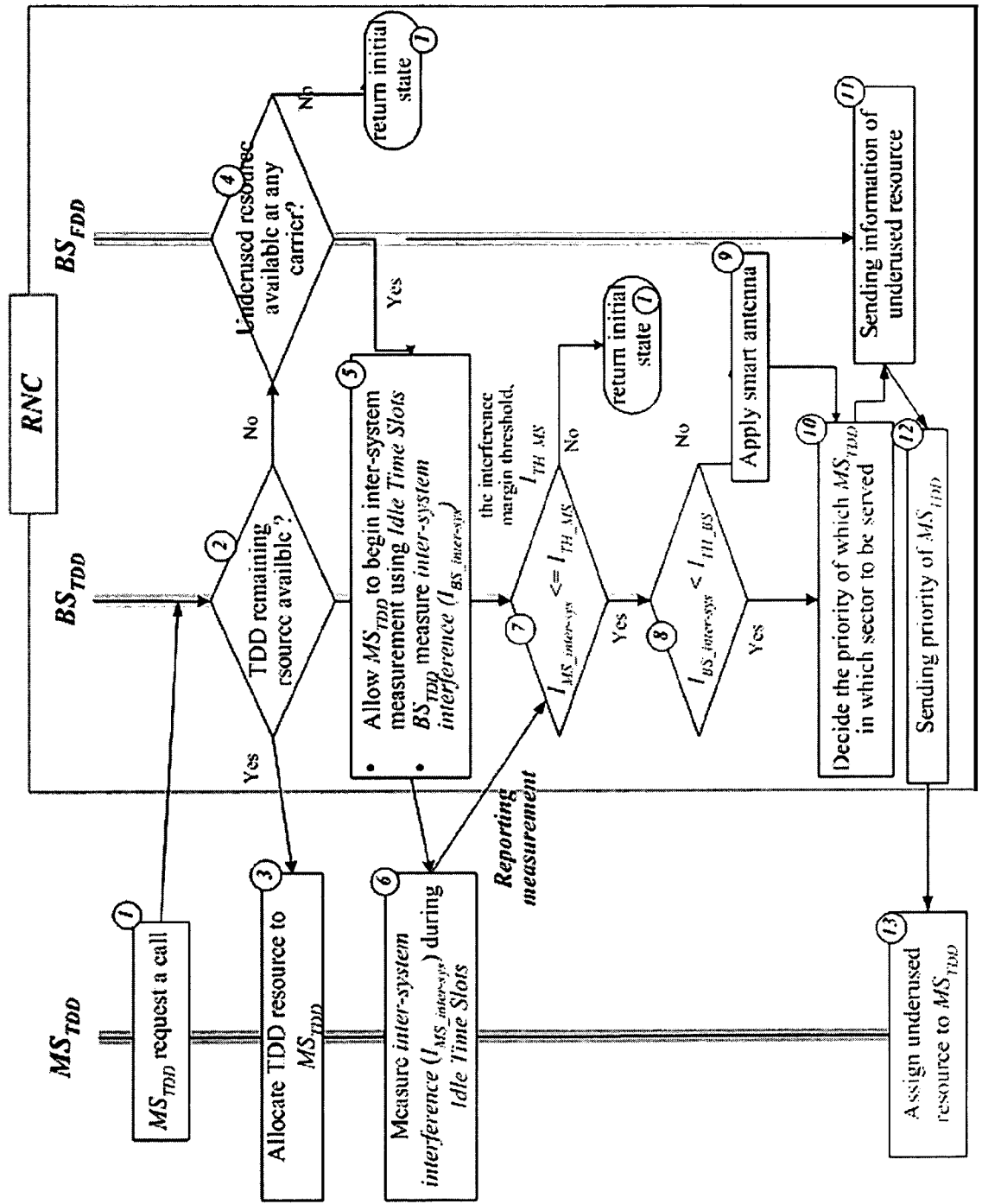
FIG. 4 is a flowchart illustrating the mechanism of resource borrowing from underused FDD carriers according to the preferred embodiment of the present invention.

Eventually, with this technique the overall system capacity can be optimized by exploiting underused frequency resource and distributing unbalanced load. Note that UMTS-FDD uplink having at least 3 carriers and an extra band around 2.5 GHz are considered to be used for the high speed data packet access (HSDPA) purpose. The mechanism of determining which sectors and which TDD MS users are preferable to borrow the underused resource at any carrier is illustrated in FIG. 4, which is performed by measuring the inter-system interference and identifying the available resource to be shared.

Once the $MS_{TDD}$ requests in a specific sector the new call to the TDD BS, the TDD BS checks the remaining resource available and sends back information of whether to use its own TDD resource or underused resource at other carriers. If the load status of the TDD BS's sector of interest is overloaded and needs extra resource, the TDD BS asks and checks the resource availability of the corresponding FDD BS (in real situation the RNC controls and performs this function), which are already decided by the sectors and cell alignment method as described above. If the sector of interest is $S_{jx}$ (j=1, 2, ..., N, x∈{1,2,3}, the FDD BS x is of concern.

The procedure blocks from 5 to 13 illustrate the interference measurement procedure, the information exchange flow, the resource borrowing, and smart antenna application decision procedure and its criteria. The simple way of inter-system and inter-frequency measurement is to use the idle time slots without traffic when the $MS_{TDD}$ is not an active state. Because the $MS_{TDD}$ opens to the neighboring $MS_{FDD}$s interfering signals when they transmitting at the same frequency band (e.g., the FDD uplink), the $MS_{TDD}$ can measure the inter-system interference (called $I_{MS\_inter-sys}$) during the idle time slots.

In addition to this interference, another main interference source is from the $MS_{FDD}$s to the TDD BS, i.e., $I_{BS\_inter-sys}$. These two types of interference are used for the resource borrowing and smart antenna application decision criteria at procedure 7 in FIG. 4. Here, the interference margin threshold ($I_{TH\_MS}$) is defined by the amount of admissible interference level with which the TDD BS can decide whether to use the resource borrowing method or not, and this is perceived and collected at the TDD BS based on the reported measurement information from every $MS_{TDD}$ as well as BS itself. This level is a time-varying random variable and dependent on the FDD MS users' distribution within a FDD sector and a TDD sector of interest. For an arbitrary user j borrowing a FDD resource and transmitting at the FDD uplink frequency, the bit energy to interference ratio $\epsilon_j^d = (E_b/I_0)_j^d$ of the TDD downlink can be denoted as in Equation (1):

$$\epsilon_j^d = \frac{pg_j^d P_j^d}{\sum_{i=1}^{K_{FDD}} p_i^{FDDu} + \eta W} \geq \gamma_j^d \tag{1}$$

where $P_j^d$ is the received signal power from the desired TDD user j and $p_i^{FDDu}$ is the received signal power from the FDD MS users of the FDD uplink, which is considered as a mutually independent random variable since the location of the FDD MS is relative to every TDD user. $K_{FDD}$ is the total number of interfering FDD MS users with TDD MS users, $\eta$ and W are the back ground thermal noise spectral density and the total bandwidth, respectively, and pg is the processing gain, which is defined as the ratio of the channel bandwidth to the information bit rate ($pg_j^d = W/R_j$) of the jth user at downlink. $\gamma_j^d$ is the desired downlink $(E_b/I_0)_j^d$ for the user j. The admissible load condition can be written as shown in Equation (2).

$$Z = \sum_{j=1}^{K_{TDD}^{add}} \epsilon_j^d = \sum_{j=1}^{K_{TDD}^{add}} \frac{pg_j^d P_j^d}{\sum_{i=1}^{K_{FDD}} p_i^{FDDu} + \eta W} \leq \frac{W}{R_j}(1-\eta). \tag{2}$$

If the inter-system interference experienced by the additional TDD MS users can be expressed as shown in Equation (3).

$$I_{MS\_iner-sys} = \sum_{i=1}^{K_{FDD}} p_i^{FDDu}. \tag{3}$$

The interference margin threshold as a value can meet the maximal load condition for all the additional TDD MS users, which can be found as in Equation (4):

$$Z_{max} = \sum_{j=1}^{K_{TDD}^{add}} \frac{pg_j^d P_j^d}{I_{TH\_MS} + \eta W} = \frac{W}{R_j}(1-\eta) \text{ and} \tag{4}$$

$\epsilon_j^d \geq \gamma_j^d$, for $j = 1, 2, \ldots, K_{TDD}^{add}$ and thus, $$I_{TH\_MS} = \frac{\sum_{j=1}^{K_{TDD}^{add}} P_j^d}{(1-\eta)} - \eta W, \text{ for } j = 1, 2, \ldots, K_{TDD}^{add}. \tag{5}$$

where $$K_{TDD}^{add}$$

is the total number of TDD MS users requesting the underutilized resource of other carrier when the maximum capacity of TDD sector was reached saturated and there is not any available TDD resource. Similarly, the inter-system interference detected by the TDD BS sector and the interference threshold at the TDD BS can be derived as shown in Equation (6)

$$\varepsilon_j^u = \frac{p g_j^u P_j^u}{\sum_{i=1}^{K_{FDD}} p_i^{FDDu} + \eta W} \geq \gamma_j^u \Rightarrow Z_{max}^u \qquad (6)$$

$$= \sum_{j=1}^{K_{TDD}^{add}} \frac{p g_j^u P_j^u}{I_{TH\_BS} + \eta W} = \frac{W}{R_j}(1-\eta) \text{ and thus,}$$

$$I_{TH\_BS} = \frac{\sum_{j=1}^{K_{TDD}^{add}} P_j^u}{(1-\eta)} - \eta W, \text{ for } j = 1, 2, \ldots, K_{TDD}^{add} \qquad (7)$$

where all terms denote the same entities except for the superscript u meaning the TDD uplink replacing with d in Equation from (1) to (5). It should be noted that the BS interference threshold ($I_{TH\_BS}$) is considerable smaller than the interference margin threshold ($I_{TH\_MS}$), because the TDD BS suffers much less inter-system interference caused by FDD MS users due to the proposed hierarchical sectors alignment method. If the TDD BS has still residual interference irrespective of this strategy that can be observed by periodical measuring the inter-system interference during the idle time slots, it can determine whether to utilize the smart antenna technique, based on this BS interference threshold ($I_{TH\_BS}$) criterion. This ensures the further interference suppressing and the reliable link to the resource borrowers.

Figure 5:
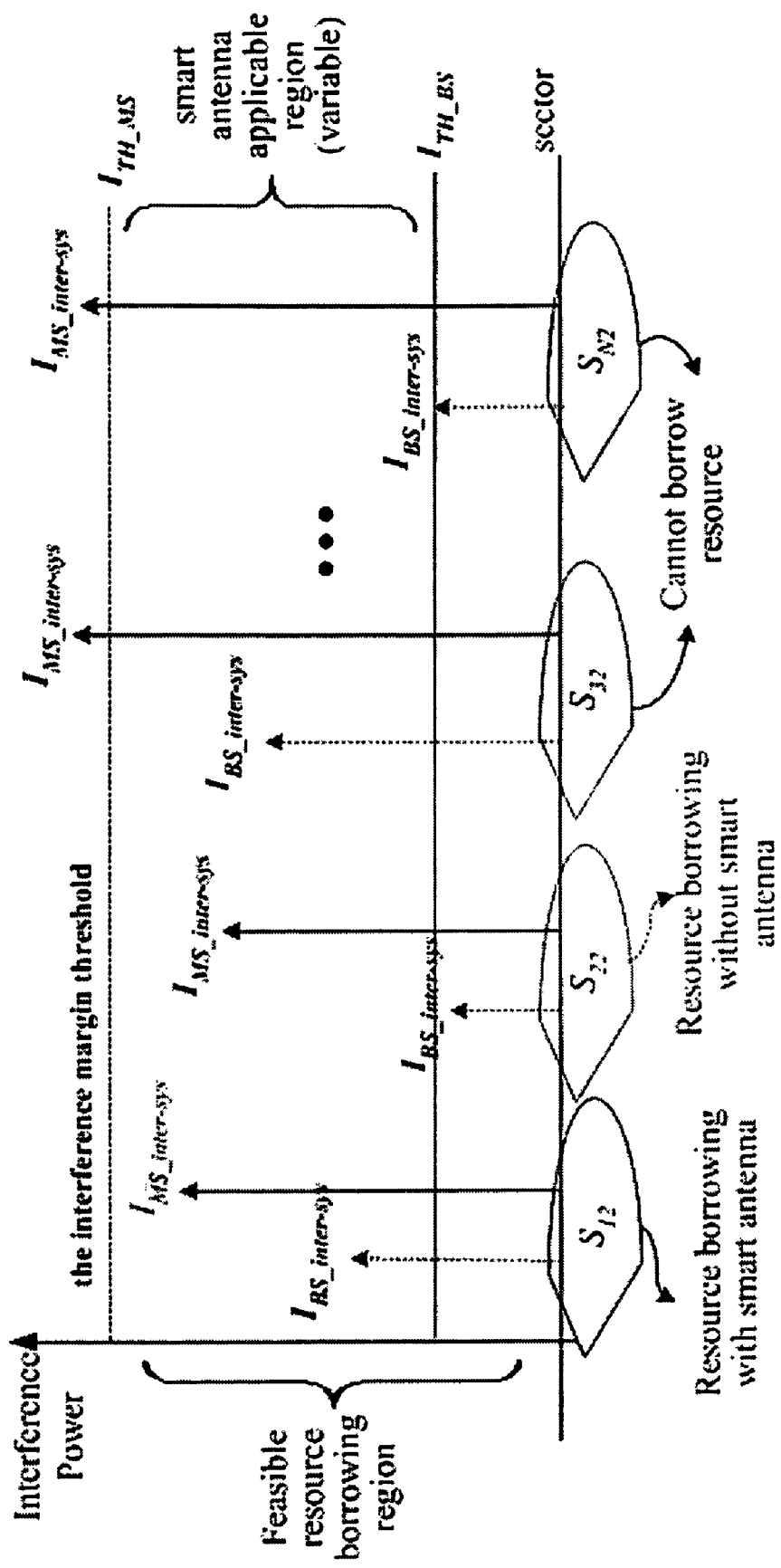
FIG. 5 is a conceptual view illustrating possible interference power level perceived by TDD BSs and MSs in a specific sector of concern for the TDD/virtual FDD hierarchical system according to the preferred embodiment of the present invention.

The possible inter-system interference power level detected by the TDD BSs and MSs is illustrated in FIG. 5. By collecting the interference measurement report from every $MS_{TDD}$ corresponding its sector and cell, the resource borrowing and assigning algorithm as illustrated in FIG. 4 can determine whether to use the resource borrowing technique with/without smart antenna technique (i.e., the procedure blocks from 6 to 10 in FIG. 4). It is noted that the mechanism of selecting the related sectors and the TDD BS are described set forth in procedure 1) and 2).

At the decision stages of procedure 7, if the $I_{MS\_inter-sys}$ exceeds the interference margin threshold ($I_{TH\_MS}$) level, the required $(E_b/I_0)_j^d$ cannot be guaranteed in that situation. Accordingly, this call cannot be allowed to borrow the underused resource of the FDD carrier. Similarly, the BS interference threshold ($I_{TH\_BS}$) indicates the maximum admissible interference to decide as to applying smart antenna technique because the TDD BS suffers the inter-system interference caused by mainly FDD MS users although the TDD/virtual FDD system structure of the current invention can reduce the inter-system interference. Therefore, the smart antenna should be used if the perceived interference level is above $I_{TH\_BS}$ level, but it should be carefully controlled compared to the inter-system interference margin threshold ($I_{TH\_MS}$) level. This eventually leads the RNC and the overall system to perform their function in a flexible and adaptive fashion.

After deciding the preference list of which sector, users, and resource to be served, finally the BS assigns the resource to the requesting users.

Figure 6:
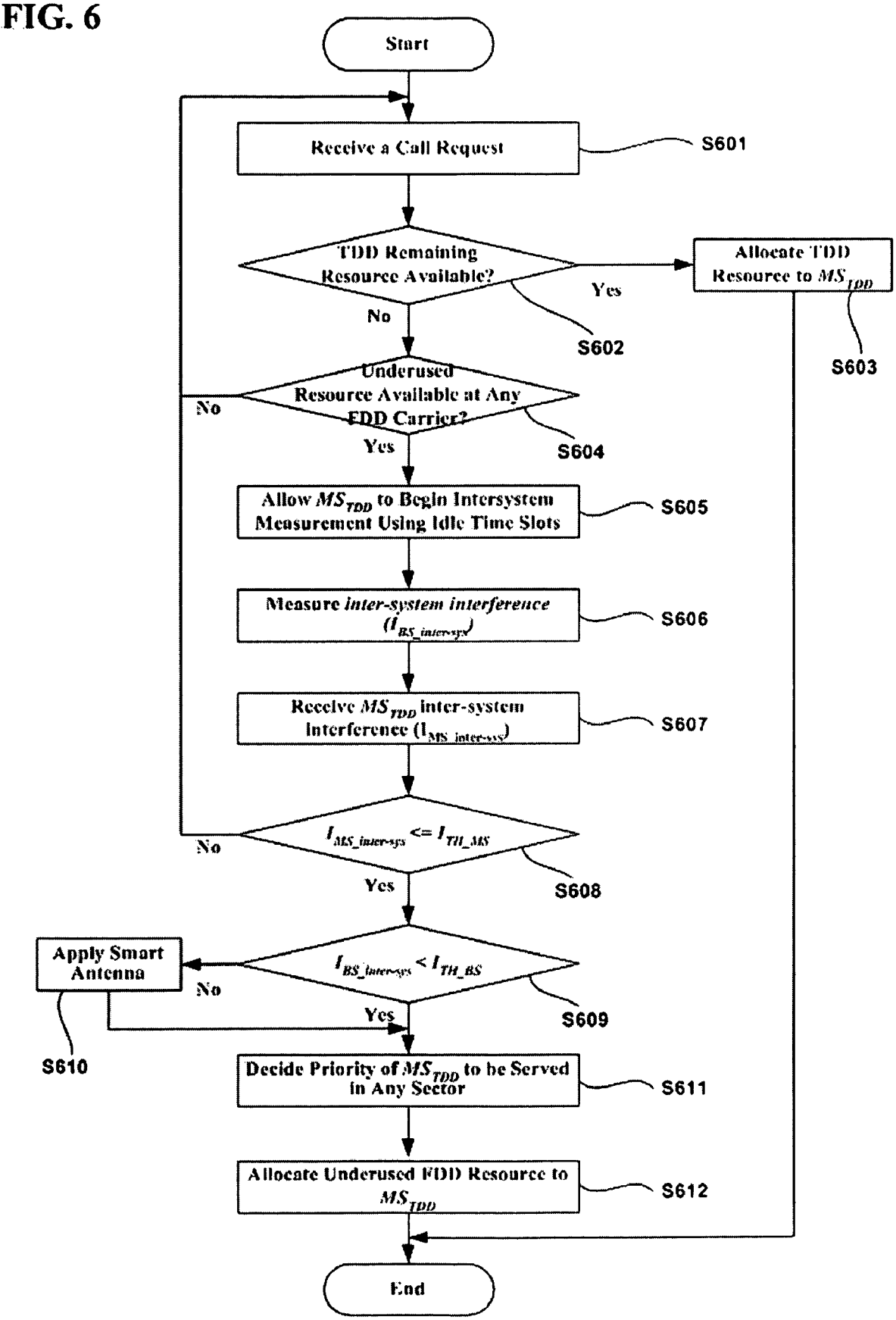
FIG. 6 is a flow chart illustrating a method of allocating resources in the TDD/virtual FDD hierarchical cellular system according to a preferred embodiment of the present invention.

FIG. 6 is a flowchart illustrating a method of allocating resources in the TDD/virtual FDD hierarchical cellular system according to the present invention. Referring to FIG. 6, once a TDD BS in a specific sector receives a new call from a $MS_{TDD}$ at step S601, the TDD BS checks whether or not TDD remaining Resource is available at step S602. If it is determined that the remaining TDD resource is available, the TDD BS allocates TDD resource to the $MS_{TDD}$ at step S603. However, if it is determined that the remaining TDD resource is not available, the TDD BS checks where or not there is underused resource available at any FDD carrier at step S604. In order to determine the FDD resource availability, the TDD BS asks corresponding FDD BS for the underused resource and responsively receives information of underused resource from the BS FDD.

If there is underused resource available, the TDD BS enables $MS_{TDD}$ to begin measuring a first inter-system interference ($I_{MS\_inter-sys}$) caused $MS_{FDD}$s by using idle time slots at step S605 and measures by itself a second inter-system interference ($I_{BS\_inter-sys}$) from $MS_{FDD}$s to the TDD BS at step S606. Otherwise, the TDD BS returns the algorithm to the step S601.

Sequentially, the TDD BS receives the first inter-system interference ($I_{MS\_inter-sys}$) measured by the $MS_{TDD}$ at step S607 and compares the same with a predetermined first interference margin threshold ($I_{TH\_MS}$) in order to determine whether or not the inter-system interference ($I_{MS\_inter-sys}$) is less than or equal to the first interference margin threshold ($I_{TH\_MS}$) at step S608.

If the first inter-system interference ($I_{MS\_inter-sys}$) is neither less than nor equal to the first interference margin threshold ($I_{TH\_MS}$), the TDD BS returns the algorithm to the step S601, and otherwise, the TDD BS compares the second inter-system interference ($I_{BS\_inter-sys}$) with a predetermined second interference margin threshold ($I_{TH\_BS}$) at step S609. If the second inter-system interference ($I_{BS\_inter-sys}$) is less than the second interference margin threshold ($I_{TH\_BS}$), the TDD BS determines priority of the $MS_{TDD}$ at step S611 and then allocates the underused FDD resource to the $MS_{TDD}$ according to the assigned priority at step S612.

At step S609, if the second inter-system interference ($I_{BS\_inter-sys}$) is not less than the second interference margin threshold ($I_{TH\_BS}$), the TDD BS apply a smart antenna for deciding priority of the $MS_{TDD}$, at step S610.

As described above, the TDD/virtual FDD hierarchical cellular system structure of the invention in combination with underused resource borrowing technique and smart antenna beam forming technique, enables less ACI and the additional inter-system interference by keeping a interference least distance between the TDD BS and the FDD BS, and fully utilizes three surrounding FDD BSs' resources with which allowing to utilize a flexible resource borrowing mechanism. In such a hierarchical cellular system suppressing the interference can be performed by aligning the sectored TDD cells' beams direction whether it uses the contiguous adjacent band of the boundary of the TDD band and the FDD uplink or the same frequency as the FDD uplink band. The further interference resolving improvement can be achieved. Additionally, the micro- (or pico-) cell's overloaded traffic into a macro-cell can be distributed, and moreover, the overall hierarchical cellular system's capacity can be optimized.

The mechanism and the algorithm of underused resource borrowing with/without smart antenna technique proposed in this invention has been described, and it is capable of providing further adaptive and flexible way to cope with the unpredictable time-varying inter-system interference problem, thereby balancing the uneven traffic loads of the micro- (or pico-) cells.

With some modification of the interference scenarios the proposed TDD/virtual FDD hierarchical cellular structure of the invention can be applied to the TDD micro-cell layer and the TDD macro-cell layer wherein using different frequency band, as well as to TDD micro- (or pico-) cell layer and FDD macro cell layer structure. In brief, the underutilized resource borrowing technique with the proposed interference resolving mechanism from macro-cell's resource pool can be applied to a generic multiple layer hierarchical cellular system wherein the macro-cell users cause the additional interference to the micro- (or pico-) cell users who borrowing the resource.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for allocating a radio resource in a cellular communication system supporting communications between fixed stations and mobile stations based on a frequency division duplexing (FDD) and a time division duplexing (TDD) scheme, comprising:
   receiving, at a TDD fixed station, a call request from a TDD mobile station;
   determining if a TDD resource is available;
   allocating the TDD resource to the TDD mobile station, when the TDD resource is available;
   borrowing a FDD resource from a FDD fixed station, when the TDD resource is not available; and
   allocating the FDD resource to the TDD mobile station according to a priority of the TDD mobile station.

2. The method of claim 1, wherein the borrowing of the FDD resource comprises:
   determining if an underused FDD resource is available at a FDD carrier;
   determining whether to borrow the underused FDD resource, if the underused resource is available; and
   determining the priority of the TDD mobile station, in response to determining to borrow the underused FDD resource.

3. The method of claim 2, wherein the borrowing of the FDD resource further comprises determining whether to apply an adaptive beamforming for determining the priority of the TDD mobile station.

4. The method of claim 3, wherein the determining of whether to apply the adaptive beamforming comprises:
   measuring, at the TDD fixed station, a second inter system interference ($I_{BS\_inter-sys}$);
   comparing the second inter-system interference ($I_{BS\_inter-sys}$) with a second interference margin threshold ($I_{TH\_BS}$); and
   applying the adaptive beamforming when the second intersystem interference ($I_{BS\_inter-sys}$) is not less than the second interference margin threshold ($I_{TH\_BS}$).

5. The method of claim 4, wherein the second inter system interference ($I_{BS\_inter-sys}$) is from FDD mobile stations to the TDD fixed station.

6. The method of claim 2, wherein the determining of whether to borrow the underused FDD resource comprises:
   comparing a first intersystem interference ($I_{MS\_inter-sys}$) received from the TDD mobile station with a predetermined first interference margin threshold ($I_{TH\_MS}$), the first intersystem interference ($I_{MS\_inter-sys}$) being measured by the TDD mobile station; and
   determining to borrow the underused FDD resource when the first intersystem interference ($I_{MS\_inter-sys}$) is less than or equal to the first interference margin threshold ($I_{TH\_MS}$).

7. The method of claim 6, wherein the first intersystem interference ($I_{MS\_inter-sys}$) is from FDD mobile stations to the TDD mobile station.

8. The method of claim 1, wherein:
   the FDD fixed station defines a macro cell and the TDD fixed station defines one of a micro and a pico cell located in a boundary of the macro cell, and
   the macro cell is sectored at an azimuth angle and forms a plurality of macro sectors, and the micro cell is sectored at the same azimuth angle with the macro cell and forms as many micro sectors as the number of the macro sectors.

9. The method of claim 8, wherein the micro cell is located in one of the macro sectors, and the TDD mobile station located in one of the micro sectors borrows an underused resource assigned for one of the macro sectors having the same azimuth angle as the micro sector in which the TDD mobile station is located.

10. The method of claim 1, wherein the FDD and TDD fixed stations form sector beams using adaptive beamforming antennas for focusing on the mobile stations.

11. The method of claim 1, wherein:
   the FDD fixed station defines a macro cell and the TDD fixed station defines one of a micro and a pico cell located in a boundary of the macro cell, and
   the macro cell is sectored and forms three or more macro sectors having respective sector beams directed from the FDD fixed station at different angles, and the micro cell is sectored and forms three or more micro sectors having respective sector beams directed from the TDD fixed station at different angles.

12. The method of claim 11, wherein the sector beam of each macro sector has a main lobe in parallel with a main lobe of at least one of the micro sectors.

13. A method for allocating a radio resource by a mobile station in a cellular communication system supporting communications between fixed stations and mobile stations based on a frequency division duplexing (FDD) and a time division duplexing (TDD) scheme, the method comprising:
   transmitting a call request by a TDD mobile station to a TDD fixed station;
   receiving a TDD resource in response to the TDD resource being available for allocation; and
   receiving a FDD resource borrowed from a FDD fixed station in response to the TDD resource not being available, wherein the FDD resource is allocated to the TDD mobile station according to a priority of the TDD mobile station.

14. The method of claim 13, further comprising:
   measuring by the TDD mobile station a first intersystem interference ($I_{MS\_inter-sys}$) for comparison with a predetermined first interference margin threshold ($I_{TH\_MS}$); and
   receiving the FDD resource where the first intersystem interference ($I_{MS\_inter-sys}$) is less than or equal to the first interference margin threshold ($I_{TH\_MS}$).

15. The method of claim 13, wherein an adaptive beamforming is applied to determine the priority of the TDD mobile station where a second inter-system interference ($I_{BS\_inter-sys}$) is not less than a second interference margin threshold ($I_{TH\_BS}$).

16. The method of claim 13, wherein:

the FDD fixed station defines a macro cell and the TDD fixed station defines one of a micro and a pico cell located in a boundary of the macro cell, and the macro cell is sectored at an azimuth angle and forms a plurality of macro sectors, and the micro cell is sectored at the same azimuth angle with the macro cell and forms as many micro sectors as the number of the macro sectors.

17. The method of claim 16, wherein the micro cell is located in one of the macro sectors, and the TDD mobile station located in one of the micro sectors borrows an underused resource assigned for one of the macro sectors having the same azimuth angle as the micro sector in which the TDD mobile station is located.

18. The method of claim 13, wherein the FDD and TDD fixed stations form sector beams using adaptive beamforming antennas for focusing on the mobile stations.

19. The method of claim 13, wherein:

the FDD fixed station defines a macro cell and the TDD fixed station defines one of a micro and a pico cell located in a boundary of the macro cell, and the macro cell is sectored and forms three or more macro sectors having respective sector beams directed from the FDD fixed station at different angles, and the micro cell is sectored and forms three or more micro sectors having respective sector beams directed from the TDD fixed station at different angles.

20. The method of claim 19, wherein the sector beam of each macro sector has a main lobe in parallel with a main lobe of at least one of the micro sectors.

* * * * *